G. A. CAMPBELL.
SIGNALING CIRCUIT.
APPLICATION FILED SEPT. 9, 1916.

1,254,473.

Patented Jan. 22, 1918.
9 SHEETS—SHEET 1.

WITNESSES:

INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,473.

Patented Jan. 22, 1918.
9 SHEETS—SHEET 2.

INVENTOR
George A. Campbell
BY
Thomas D. Lockwood
ATTORNEY

G. A. CAMPBELL.
SIGNALING CIRCUIT.
APPLICATION FILED SEPT. 9, 1916.
1,254,473.
Patented Jan. 22, 1918.
9 SHEETS—SHEET 3.
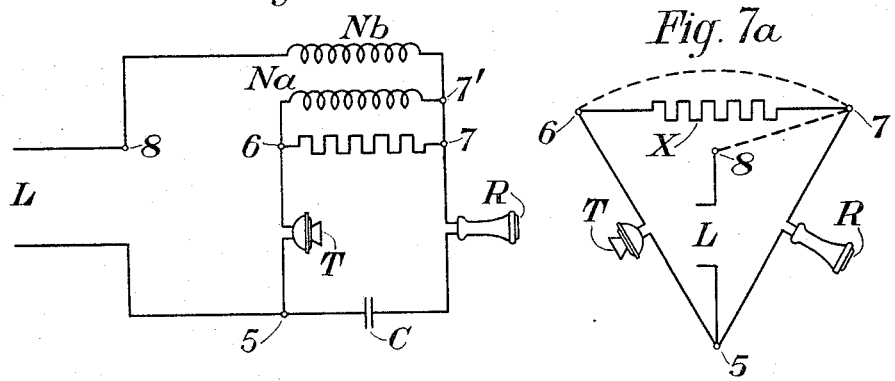
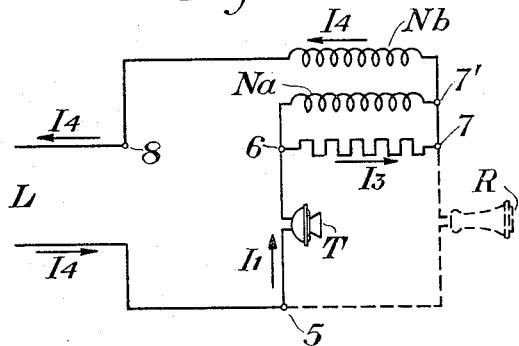
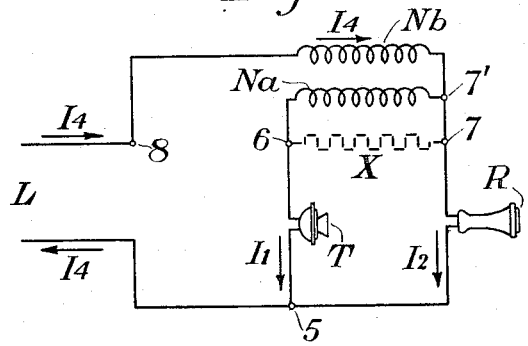
WITNESSES:
Joseph A. Jolly
John B. Hynes
INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,473.

Patented Jan. 22, 1918.
9 SHEETS—SHEET 4.

WITNESSES:
Joseph A. Gatley
John B. Hynes

INVENTOR
George A. Campbell
BY
Thomas D. Lockwood
ATTORNEY

G. A. CAMPBELL.
SIGNALING CIRCUIT.
APPLICATION FILED SEPT. 9, 1916.
1,254,473.
Patented Jan. 22, 1918.
9 SHEETS—SHEET 5.
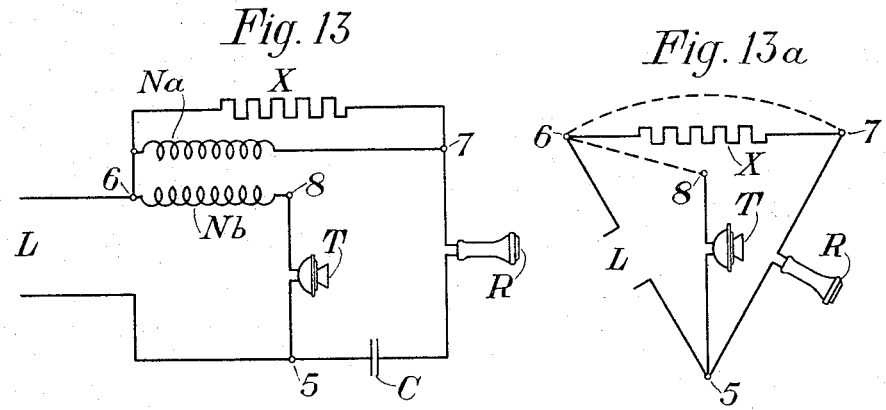
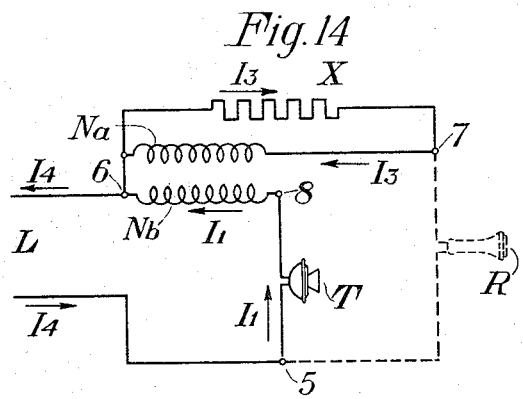
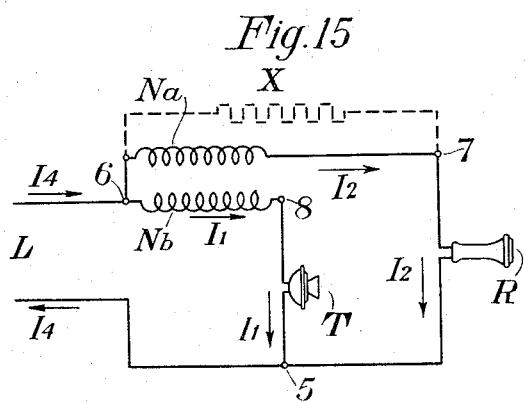
WITNESSES:
INVENTOR
George A. Campbell
BY
Thomas D. Lockwood
ATTORNEY G. A. CAMPBELL.
SIGNALING CIRCUIT.
APPLICATION FILED SEPT. 9, 1916.
1,254,473.
Patented Jan. 22, 1918.
9 SHEETS—SHEET 7.
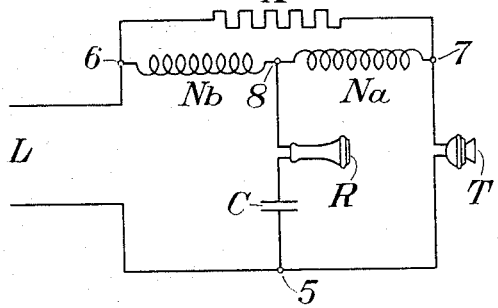
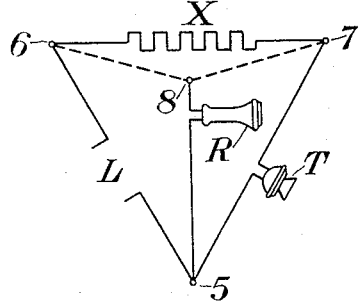
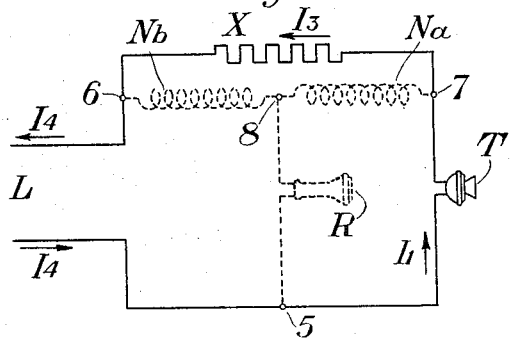
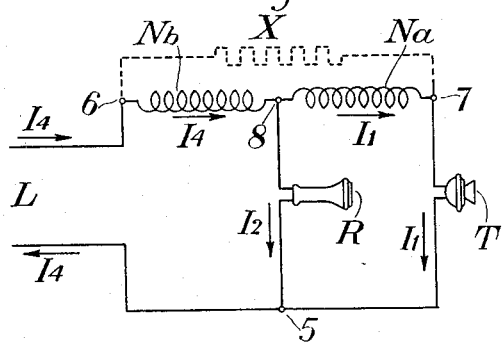
WITNESSES:
Joseph A. Galey
John B. Hynes
INVENTOR
George A. Campbell
BY
Thomas D. Lockwood
ATTORNEY G. A. CAMPBELL.
SIGNALING CIRCUIT.
APPLICATION FILED SEPT. 9, 1916.
1,254,473.
Patented Jan. 22, 1918.
9 SHEETS—SHEET 8.
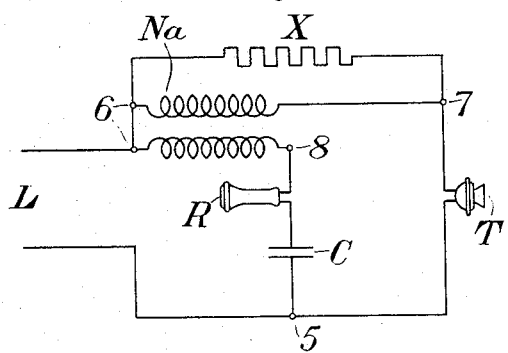
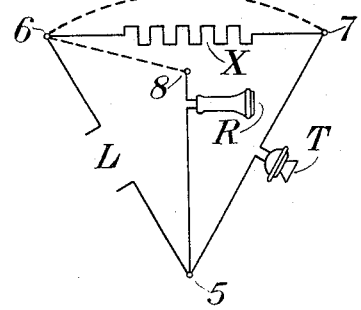
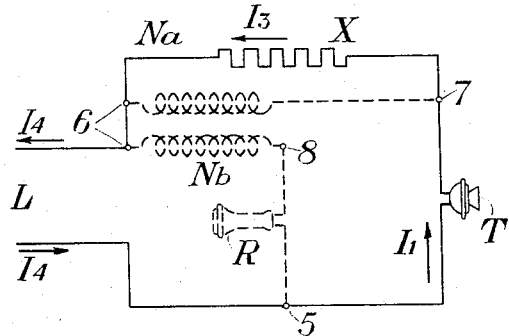
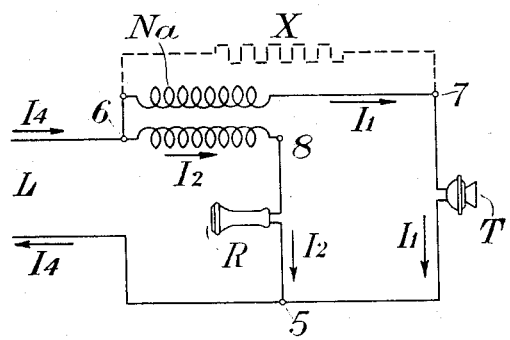
WITNESSES:
INVENTOR
George A. Campbell
BY
Thomas D. Lockwood
ATTORNEY

G. A. CAMPBELL.
SIGNALING CIRCUIT.
APPLICATION FILED SEPT. 9, 1916.

1,254,473.

Patented Jan. 22, 1918.
9 SHEETS—SHEET 9.

WITNESSES:
Joseph A. Gately
John T. Hynes

INVENTOR
George A. Campbell
BY
Thomas Lockwood
ATTORNEY

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

SIGNALING-CIRCUIT.

1,254,473.  Specification of Letters Patent.  Patented Jan. 22, 1918.

Application filed September 9, 1916. Serial No. 119,284.

*To all whom it may concern:*

Be it known that I, GEORGE A. CAMPBELL, residing at Montclair, in the county of Essex and State of New Jersey, have invented certain Improvements in Signaling-Circuits, of which the following is a specification.

This invention relates to circuit arrangements for signaling systems wherein signals may be either transmitted from or received at the same station. In its more specific aspects this invention is embodied in a subscriber's telephone station, hereinafter termed, in accordance with common usage, a substation, and more particularly in the combination of a substation and a telephone line. Its object is to provide a signaling circuit arrangement which in coöperative combination with a similar and equal communicating arrangement or station shall deliver the maximum amount of energy to the receiving apparatus of said communicating station or arrangement. A further object is to provide an arrangement such that the receiving apparatus is protected from interference by the transmission energy originating at the same station. In other words its object is to provide signaling means characterized by the maximum possible ratio of received and transmitted energy and further characterized by the absence of side tone.

The object of the invention is attained, in its specific aspect, by providing a substation consisting of transmitter, receiver, auxiliary resistance, and a transformer having a plurality of windings which, in combination with a telephone line, shall satisfy the following fundamental requirement: Given two identical substations designed for invariable two-way communication, and connected by a line of given impedance and length, the amount of energy absorbed by the receiver at the receiving station shall be the maximum part of the total telephonic energy developed by the transmitter at the transmitting station consistent with invariable two-way communication, and, as hereinafter explained, consistent with a desirable amount of discrimination against disturbing line noise. This fundamental requirement may be stated in terms of the following subordinate requirements which are necessary for its satisfaction: (1) The transmitter and receiver shall be conjugate, that is there shall be negligible side tone in the receiver in consequence of the actuation of the transmitter by sound waves; (2) the line and auxiliary resistance shall be conjugate in order that none of the energy absorbed by the substation from the line shall be wasted in said auxiliary resistance; (3) for a given line having a definite impedance the telephonic energy delivered by the transmitter shall be a maximum; (4) the amount of energy delivered by the line to the substation shall be a maximum, in other words the impedance of the substation as seen from the line shall be equal to the impedance of the line; (5) at a small sacrifice of efficiency it shall be possible to discriminate effectively against disturbing line noise as distinguished from the telephonic signals from the communicating station.

A substation satisfying the above-mentioned requirements is ideal in that its over-all efficiency from transmitter of one substation to receiver of the communicating substation is a theoretical maximum which cannot be exceeded by any invariable substations whether satisfying the requirement of transmitter and receiver conjugacy or not. It is further ideal in the sense that a minimum number of elements is employed since at least one auxiliary element is necessary to secure freedom from side tone.

It might be inferred that the addition of an auxiliary resistance element, necessary as it is to secure freedom from side tone, would at the same time necessarily reduce the efficiency of the substation since energy is unavoidably wasted in said auxiliary resistance. That this is not the case and that the efficiency of the substation of my invention is a theoretical maximum which cannot be exceeded by any two-way substation whether with or without side tone, the following considerations will show. The simplest form of substation for invariable two-way communication is that in which the receiver and transmitter are connected in series with each other across the line. In such an arrangement the over-all efficiency is a maximum when the resistance of the receiver is equal to that of the transmitter. When this condition is satisfied obviously fifty per cent. of the energy delivered by the line to the substation is wasted in the transmitter and fifty per cent. of the energy delivered by the transmitter is wasted in the receiver. Further such an arrangement labors under the disadvantage of full side tone. In the substation of my invention fifty per cent. of the energy delivered by the line to the substation is wasted in the transmitter but none in the auxiliary resistance if said auxiliary resistance and said line are conjugate; hence the efficiency is as great as that of the simple series substation. When transmitting no energy is wasted in the receiver but fifty per cent. of the energy delivered by the transmitter is wasted in the auxiliary resistance. The transmitting efficiency is therefore also a theoretical maximum and neither transmitting nor receiving efficiency is reduced by the addition of the auxiliary resistance which is necessary to secure freedom from side tone. The foregoing consideration will serve to explain the desirability of having the line and auxiliary resistance conjugate as well as the transmitter and receiver.

In my present invention I provide a substation comprising transmitter, receiver, auxiliary resistance and transformer and so proportion said component elements and so relate them to a telephone line and to each other that, in combination with said telephone line, said substation satisfies all of the foregoing requirements.

I have discovered that the above-mentioned requirements may be satisfied by a large number of arrangements employing the minimum number of elements and all equally efficient and without side tone. While theoretically all these arrangements are equally good, practical considerations make certain arrangements preferable.

My invention will now be fully understood by reference to the accompanying drawing in which:

Figure 1 is a diagram representing one form of my invention, while Figs. 4 and 7 are modifications in which the transformer connections are interchanged.

Fig. 10 is a diagram of a second form of my invention, of which Figs. 13 and 16 represent modifications produced by varying the transformer connections.

Fig. 19 is a diagram of a third general form of my invention, Figs. 22 and 25 being diagrams of modifications produced by changing the transformer connections.

Figs. 2, 5, 8, 11, 14, 17, 20, 23 and 26 are diagrams illustrating the current flow in Figs. 1, 4, 7, 10, 13, 16, 19, 22 and 25 respectively, during the transmission of signals from the substation.

Figs. 3, 6, 9, 12, 15, 18, 21, 24 and 27 are diagrams showing the current flow in Figs. 1, 4, 7, 10, 13, 16, 19, 22 and 25 respectively, where signals are being received by the substation.

Figure 1:
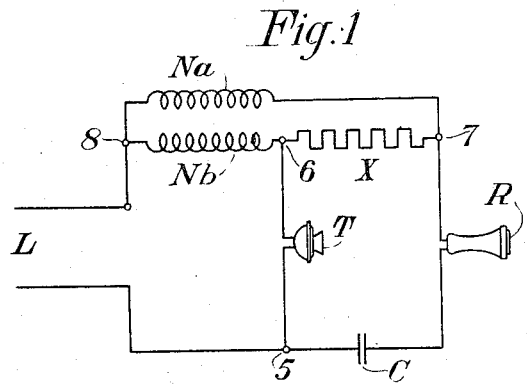
Figure 1A:
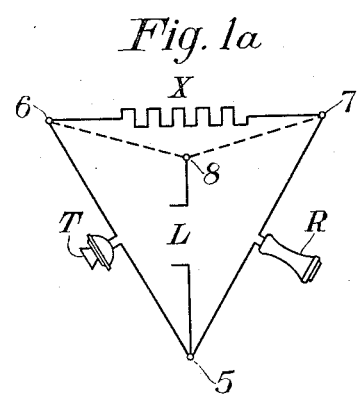

Figs. 1(a), 4(a), 7(a), 10(a), 13(a), 16(a), 19(a), 22(a), and 25(a) are schematic diagrams of the substations of Figs. 1, 4, 7, 10, 13, 16, 19, 22 and 25 respectively, the diagrams being simplified and so arranged as to indicate more clearly the equivalence of the several modifications.

In order to illustrate the scope of my invention and elucidate the principles on which all specific embodiments rest, a general theoretical discussion will now be given which applies to all substations satisfying the requirements heretofore stated in this specification. In this discussion and the equations and formulæ included in this specification the subscripts 1, 2, 3 and 4 will refer to transmitter, receiver, auxiliary resistance and line respectively. Thus $I_1$, $I_2$, $I_3$, $I_4$ will denote the currents flowing in transmitter, receiver, auxiliary resistance and line respectively, while $R_1$ will denote the resistance of the transmitter, $R_2$ the resistance of the receiver, etc.

Consider a substation consisting of transmitter, receiver, auxiliary resistance and appropriate transformer windings, connected to a line of given impedance. In practice the line connects two similar and equal substations between which communication is established. It is a well known principle that if a terminal impedance is connected to a source of electromotive force through a line of impedance $$Z = R_4 + iR'_4,$$

where $R_4$ is the resistance and $R'_4$ the reactance component of the impedance, the terminal impedance must be $R_4 - iR'_4$ for maximum absorption of energy. In particular if the line impedance has no reactance component, the impedance of the terminal arrangement as seen from the line should be equal to the resistance component of the impedance of the line. The condition, then, that the substation shall have maximum energy absorption from the line is that its impedance, as seen from the line, shall be equal to the line impedance. The significance of the foregoing statement may be explained by reference to Fig. 1 as follows: Let the substation be disconnected from the line and let the impedance of the substation be measured across terminals 8 and 5. Then the impedance so measured shall be equal to the impedance of the line. With the line terminated at each end by a substation satisfying this condition, the line may be replaced, as regards transmission from either substation, by an impedance element of resistance equal to the impedance of the line. Any reactance effect, which is in practice small, may be eliminated by neutralizing reactance and, therefore, need not be considered. The condition, then, that the substation have maximum energy absorption from the line is that its impedance as seen from the line be a pure resistance of value equal to the impedance of the line. This condition is evidently equivalent to the following requirement; let an electromotive force be impressed on the substation terminals through a resistance equal to the impedance of the line; then the energy consumed in the substation shall be equal to the energy consumed in said resistance.

Further, line and auxiliary resistance are conjugate by requirement (2), as hereinbefore stated, or in other words, the auxiliary resistance is connected to points of equal potential with respect to an electromotive force applied to the line terminals. Moreover, the impedance of the substation as seen from the line should be equal to that of the line. Let, then, an electromotice force $E_4$ be impressed through a resistance $R_4$ on a substation whose transmitter and receiver resistances are $R_1$ and $R_2$ respectively, and let the resultant currents in line, transmitter and receiver be $I_4$, $I_1$ and $I_2$ respectively; then the impedance across the substation terminals must be $R_4$ as seen from the line and the total resistance in series with $E_4$ is $2R_4$, and since the current in the line is $I_4$, it follows that $$\frac{E_4}{2R_4} = I_4$$

The total energy consumed may then be expressed by the formula $$I_4^2 R_4 + I_1^2 R_1 + I_2^2 R_2 = I_4 E_4 = \frac{E_4^2}{2R_4}$$

Since the energy consumed by the substation is equal to that consumed by the resistance $R_4$ and is therefore one half of the total energy consumed, it follows that requirement 4 may be formulated by the following equation:

$$R_4(I_4)^2 = (I_2)^2 R_2 + (I_1)^2 R_1 = \frac{(E_4)^2}{4R_4} \quad (1)$$

This equation states that the energy consumption in the resistance $R_4$ is equal to that in the substation, and that the substation is equivalent, as seen from the line, to a resistance of value $R_4$.

Similarly, if transmitter and receiver are conjugate the condition that the transmitter shall have its maximum output to line and auxiliary resistance may be formulated as follows: Let an electromotive force $E_1$ in the transmitter produce currents $I_1$, $I_4$ and $I_3$ in transmitter, line and auxiliary resistance. Then, for maximum output, it follows that $$(I_1)^2 R_1 = (I_4)^2 R_4 + (I_3)^2 R_3 = \frac{(E_1)^2}{4R_1} \quad (2)$$

Equation (2) is the analogue of equation (1) and may be interpreted as follows by reference to Fig. 1: Let the transmitter be disconnected from terminals 5 and 6 and let the impedance be measured across said terminals. Then if equation (2) is satisfied the impedance so measured is equal to the impedance of the transmitter itself. In other words, the impedance of the combination, as seen from the transmitter is equal to that of the transmitter itself.

As hereinafter shown for the particular embodiments of my invention, equation (2) follows as a consequence of the conditions of double conjugacy and equation (1). Therefore the foregoing four requirements impose but three restrictions on the substation.

To complete the general discussion it remains to consider the energy division between receiver and transmitter when receiving, and between line and auxiliary resistance when transmitting. Let $W_0$ be the total amount of telephonic energy developed by the transmitter at the transmitting substation; then, by equation (2), $1/2 W_0$ is the amount of energy delivered to line and auxiliary resistance. Let the amount of energy taken by the auxiliary resistance be $x$ times that taken by the line, then the amount of energy taken by the line is $$1/2 W_0 \frac{1}{(1+x)}$$

so that the transmitting efficiency is measured by $$\frac{1}{(1+x)} \quad (3)$$

Of the total energy delivered to the receiving substation, let the transmitter absorb $y$ times that absorbed by receiver; then the receiving efficiency is measured by $$\frac{1}{(1+y)} \quad (4)$$

The over-all efficiency from transmitter of one station to receiver of communicating station is clearly proportional to the product of the transmission efficiency and receiving efficiency; therefore the over-all efficiency is by formulæ (3) and (4):

$$\left(\frac{1}{1+x}\right)\left(\frac{1}{1+y}\right)$$

If $x$ and $y$ were independent, clearly the over-all efficiency would be a maximum for $x=y=0$. For all substations embodying the principles of my invention it may be readily shown, however, that $x$ and $y$ are connected by the relation $xy=1$. Eliminating $x$ from the above formula by means of this relation, the expression for the over-all efficiency becomes $$\frac{y}{(1+y)^2} \quad (5)$$

In order to demonstrate the above statement, namely that $xy=1$, designate the elements or branches T, R, X and L by 1, 2, 3 and 4, respectively, and let 1 and 2 be conjugate and also 3 and 4 be conjugate. Further it will be assumed for an electromotive force in branch 4, equation (1) is satisfied while for an electromotive force in branch (1), equation (2) is satisfied. Let $S_{11}$ denote the current produced in branch or element 1 by a unit electromotive force in branch 1, $S_{12}$ the current produced in branch 2 by a unit electromotive force in branch 1, etc. Then by the conjugacy of branches 1 and 2 and branches 3 and 4, it follows that $$S_{12} = S_{34} = 0.$$

Also by equation (1)

$$(S_{44})^2 R_4 = (S_{42})^2 R_2 + (S_{41})^2 R_1 = \frac{1}{4R_4} \quad (1')$$

and by equation (2)

$$(S_{11})^2 R_1 = (S_{13})^2 R_3 + (S_{14})^2 R_4 = \frac{1}{4R_1} \quad (2')$$

Now it is a fundamental principle which is deducible from elementary algebra, that $S_{41} = S_{14}$. That is, the current set up in branch 1 by a unit electromotive force in branch 4 is equal to the current set up in branch 4 by a unit electromotive in branch 1. Multiplying equation (1') by $R_4$ and equation (2') by $R_1$ and subtracting it follows that:

$$(S_{42})^2 R_2 R_4 = (S_{13})^2 R_1 R_3 \quad (a)$$

Now in accordance with the notation adopted in this specification, the energy consumed in branch 3 is $x$ times that consumed in branch 4 when an electromotive force acts in branch 1; therefore $$(S_{13})^2 R_3 = x(S_{14})^2 R_4 \quad (b)$$

Also the energy consumed in branch 1 is $y$ times that consumed in branch 2 when an electromotive force acts in branch 4; whence $$(S_{14})^2 R_1 = y(S_{24})^2 R_2 \quad (c)$$

Multiplying (b) and (c)

$$(S_{13})^2 R_1 R_3 = xy(S_{24})^2 R_2 R_4 \quad (d)$$

From (a) and (d) it follows at once that $xy = 1$.

Obviously the expression given by formula (5) is a maximum when $y=1$. This means that for a given amount of telephonic energy developed in the transmitter at the transmitting substation a maximum amount is usefully delivered to the receiver at the receiving substation connected by the line, when $y=1$. Since the maximum amount of energy in the receiver is the prime desideratum of telephony, it would appear that the substation should be designed to make $y=1$. Another consideration, however, modifies this conclusion somewhat, namely, the effect of line noise. Since the line noise originates in the line the amount delivered to the receiver is proportional to $$\frac{1}{1+y}$$

(see equation 4) while the amount of energy delivered from the transmitter of the communicating station is proportional to $$\frac{y}{1+y^2}$$

(see equation 5). The ratio of the latter to the former is $$\frac{y}{1+y}$$

and this increases as $y$ increases beyond unity. It will be clear, then, that if $y$ is made greater than unity the substation discriminates against line noise as compared with the signals it is desired to receive. The amount of discrimination desired depends of course on the amount of line noise present. For conditions occurring in practice I have found by experiment that a desirable value for $y$ is 1.4. With this value of $y$ the over-all efficiency is reduced 2.8% below the maximum for $y=1$, while the receiving efficiency alone is reduced 16.6%. It is thus seen that a good degree of discrimination against line noise is obtained with a small loss in over-all efficiency.

The above considerations as to over-all efficiency and discrimination against line noise may be formulated as $$R_1(I_1)^2 = yR_2(I_2)^2 \quad (6)$$

for an electromotive force inserted in the line. In this equation $y$ is to have a value lying between 1 and 1.5 preferably.

Proceeding now to a description of the specific circuits, one form of my invention is illustrated in Fig. 1 in which L represents a telephone line terminating in a substation comprising a transmitter T, a receiver R, an auxiliary resistance X and a two winding induction coil, the windings of which are designated $N_a$ and $N_b$. The line L, transmitter T and receiver R are connected to a common terminal 5, the remaining terminals 6 and 8 of the transmitter and line respectively being interconnected by the winding $N_b$ of the induction coil, while the terminal 7 of the receiver and terminal 8 of the line are interconnected by the winding $N_a$, the coils $N_a$ and $N_b$ being oppositely wound. The auxiliary resistance X is bridged between terminals 6 and 7 of the transmitter and receiver respectively. A condenser C may be provided if desired to prevent the flow of direct current in the receiver.

Figure 2:
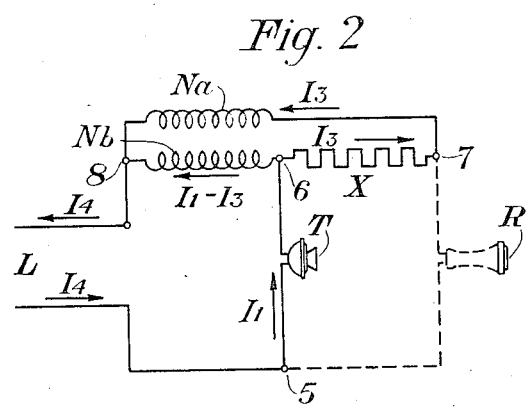

The operation during transmission is indicated in Fig. 2 in which the arrows represent the direction of current flow at any given instant. When the transmitter T is operated, variations of current flow are produced, the effect being equivalent to applying a variable electromotive force to the transmitter. As the resistance of windings $N_a$ and $N_b$ is negligible the applied electromotive force tends to raise terminals 6, 8 and 7 to the same potential, so that the current would tend to divide and part flow through the line and part through the receiver, the resistance X being in effect short circuited. Owing to the high inductance of the coils, however, an electromotive force is induced in the coil $N_a$ of such value and direction as to reduce the terminal 7 to the same potential as terminal 5 so that no current can flow through the receiver, and a counter-electromotive force is induced in winding $N_b$ in such direction as to prevent the full transmitter current $I_1$ from flowing through the winding $N_d$. As a result the current $I_1$ divides at terminal 6 and a current $I_3$ flows through the resistance X and winding $N_a$ to terminal 8, while the remainder $(I_1-I_3)$ flows through the winding $N_b$ to terminal 8, where the two currents combine so that a line current $I_4$ equal to the transmitter current $I_1$ flows over the line and back to the transmitter.

Figure 3:
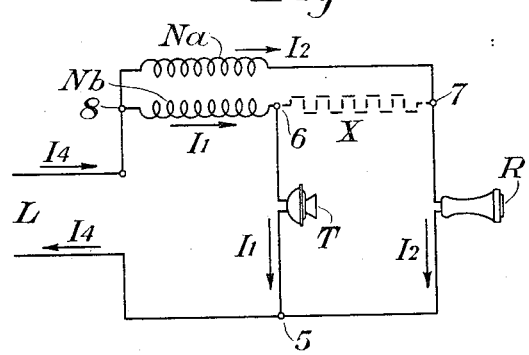

The action during reception is indicated in Fig. 3 and is as follows: Upon the application of a receiving potential to the line terminals a current $I_4$ flows from the line to terminal 8 where it divides and a current $I_2$ flows through winding $N_a$ and receiver R to terminal 5, while a current $I_1$ flows through winding $N_b$ and transmitter T to the same terminal where the two currents combine so that a current $I_4$ flows back over the line. No current flows through the resistance X which it will be noted is connected across neutral points 6 and 7 of a Wheatstone bridge of which coils $N^a$ and $N^b$, transmitter T and receiver R constitute the legs. As the coils $N_a$ and $N_b$ are of negligible resistance no difference in potential exists between points 6 and 7 and the windings $N_a$ and $N_b$ are so proportioned that the resultant induced electromotive force shall be zero so as not to disturb this equality of potential. The only receiving energy wasted is that passing through the transmitter, this loss being comparable to the transmitter loss in the standard set.

The design formulæ by which the various elements of the substation may be proportioned to accomplish the above results and satisfy the five fundamental requirements outlined in the first part of the specification, may be derived as follows:

The first requirement is that during transmission the receiver must be conjugate with respect to the transmitter, or in other words, the receiver must be connected across points of equal potential with respect to an electromotive force applied to the transmitter. Let the number of turns of the windings of the induction coil connected between the transmitter and the line be designated as $n_{14}$, the turns between the line and receiver be $n_{42}$ and between the transmitter and receiver be $n_{12}$, and let K be the potential drop per turn. Then from Fig. 2 if a potential V be applied to the terminals 5 and 6 of the transmitter, the drop through $N_b$ and the line must be equal to V. So also the drop through X, $N_a$ and the line must equal V. Therefore $$V = Kn_{14} + R_4I_4$$
$$V = R_3I_3 - Kn_{42} + R_4I_4$$

The factor $Kn_{42}$ being an increase in potential instead of a fall in potential is given the minus sign. From these equations we get $$(a)\quad R_3I_3 - Kn_{14} + Kn_{42} = K(n_{42}+n_{14})$$

Moreover since points 5 and 7 are at the same potential the drop through X must equal the drop through $N_b$ and the line. Therefore $$R_3I_3 = Kn_{14} + R_4I_4$$

From the last two equations it is clear that $$R_4I_4 = Kn_{42}$$

From this equation and equation $(a)$ we get $$(b)\quad \frac{R_3I_3}{R_4I_4} = \frac{n_{42}+n_{14}}{n_{42}}$$

The current flowing through winding $N_a$ is $I_3$. Moreover since current $I_1$ is equal to current $I_4$, it is clear that the current flowing through $N_b$ is $I_4-I_3$.

If, then, the impedances of the transformer windings are very high the resultant magnetizing current must be zero, whence $$I_3 n_{42} = (I_4-I_3)n_{14}$$

or transposing $$(c)\quad I_3(n_{42}+n_{14}) = I_4 n_{14}$$

From this equation and equation $(b)$ the following equation may be derived:

$$R_3 = \left(\frac{n_{42}+n_{14}}{n_{42}}\right)\left(\frac{n_{42}+n_{14}}{n_{14}}\right)R_4 \quad (7)$$

The above equation satisfies the condition that the receiver must be conjugate with respect to the transmitter during transmission. The next requirement is that the auxiliary resistance must be conjugate with respect to the line during reception so that no energy shall be wasted in the auxiliary resistance. If, then, in Fig. 3, a potential V be applied to the line terminals it is apparent that the potential drop through winding $N_a$ and the receiver must equal the potential drop through $N_b$ and the transmitter. Therefore, $$Kn_{42} + R_2I_2 = Kn_{14} + R_1I_1$$

But since terminals 6 and 7 are at the same potential, $$Kn_{42} = Kn_{14}$$

Hence $$R_1I_1 = R_2I_2$$

Moreover the resultant magnetizing current in the transformer must equal zero, whence $$I_1 n_{14} = I_2 n_{42}$$

From the last two equations we get as the expression satisfying the requirement of conjugacy between the auxiliary resistance and line $$R_1 \left(\frac{n_{42}}{n_{14}}\right) = R_2 \quad (8)$$

The next consideration is that of maximum absorption of energy by the receiver during reception. From the equation $$I_1 n_{14} = I_2 n_{42}$$

just developed it is apparent that during reception currents $I_1$ and $I_2$ are proportional to $n_{42}$ and $n_{14}$ respectively. It is also apparent from Fig. 3 that $$I_4 = I_1 + I_2.$$

Therefore current $I_4$ is proportional to $n_{42} + n_{14}$. Substituting these values in equation (1) we have as the expression for maximum absorption by the receiver $$R_4(n_{42} + n_{14})^2 = R_2(n_{14})^2 + R_1(n_{42})^2 \quad (9)$$

The requirement of over-all efficiency and discrimination against line noise was expressed in equation (6). Substituting the same values in this equation we have $$R_1 = y R_2 \left(\frac{n_{14}}{n_{42}}\right)^2 \quad (10)$$

The next consideration is that the transmitter shall supply maximum energy to the line during transmission. From equation (c) above developed it is apparent that during transmission $I_4$ is proportional to $n_{42} + n_{14}$ and $I_3$ is proportional to $n_{14}$. From Fig. 2 it is also apparent that $I_1 = I_4$ so that $I_1$ must be proportional to $n_{42} + n_{14}$. Substituting these values in equation (2) we have as the expression for maximum output of the transmitter $$R_1(n_{42} + n_{14})^2 = R_3(n_{14})^2 + R_4(n_{42} + n_{14})^2 \quad (11)$$

From equations 7 to 11 inclusive the following design formulæ are reducible:

$$\left.\begin{array}{l} R_1 = \left(\dfrac{y+1}{y}\right) R_4 \\[4pt] R_2 = (y+1) R_4 \\[4pt] R_3 = \dfrac{(y+1)^2}{y} R_4 \\[4pt] \dfrac{n_{42}}{n_{14}} = y \end{array}\right\} (A)$$

It will be observed that the values of the resistances of the transmitter, receiver and auxiliary resistance are determined from the known impedance $R_4$ of the line and the energy division factor $y$. If in the arrangement of Fig. 1 the ratio of the number of turns on winding $N_a$ to the number on $N_b$ be denoted by $r$, it follows from the fourth of formulæ (A) that, $$r = y \quad (12)$$

Figure 4:
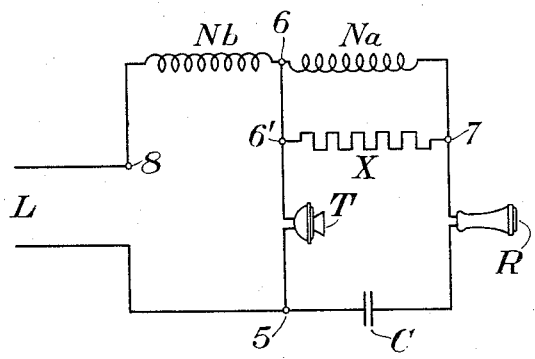
Figure 4A:
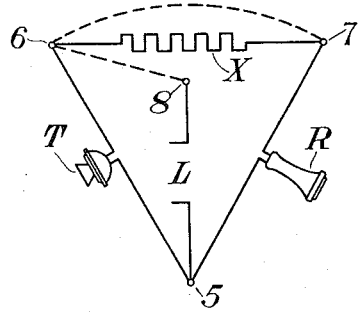

A modification is shown in Fig. 4 which differs from the form shown in Fig. 1 in the connections of the transformer, the winding $N_a$ interconnecting terminals 6 and 7 instead of 8 and 7 as in Fig. 1, the coils being wound in opposite directions. The essential difference will be clear from a comparison of Figs. 1(a) and 4(a).

Figure 5:
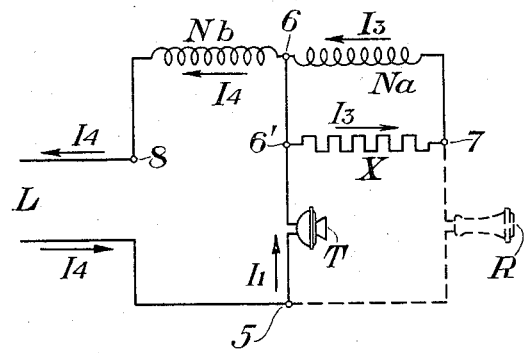

The action during transmission is indicated in Fig. 5 and is as follows:—A variable electromotive force is set up in the transmitter T which tends to raise terminals 6, 7 and 8 to the same potential owing to the negligible resistance of windings $N_a$ and $N_b$, so the resistance X would be, in effect, shortcircuited, and the current flow would divide between the line and receiver. Owing to the inductance in the coils, however, an electromotive force is induced in winding $N_a$ of such value and direction as to lower terminal 7 to the same potential as terminal 5, so that no current flows through the receiver. Consequently a current of instantaneous value $I_1$ flows through the transmitter to terminals 6—6', and a line current $I_4$ equal to current $I_1$ flows over the line and back to the transmitter, while an induced current $I_3$ flows in the local circuit including winding $N_a$, terminals 6—6', resistance X and terminal 7.

Figure 6:
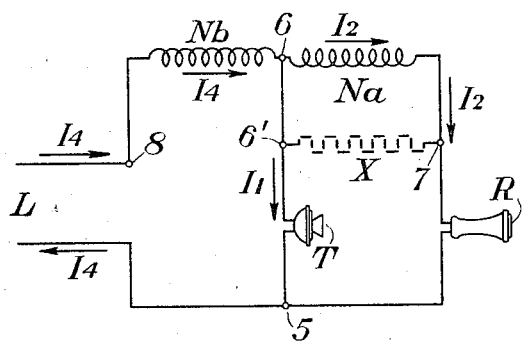

The action during reception of signals is indicated in Fig. 6. A potential applied to the line terminals causes a line current $I_4$ to flow through coil $N_b$ to terminal 6 where it divides and a current $I_1$ flows through the transmitter while a current $I_2$ flows through coil $N_a$ and the receiver R back to the line. No current flows through resistance X which is connected across neutral points of a Wheatstone bridge, of which the receiver and transmitter form two legs, the connection 6—6' of zero resistance forming a third leg, and the coil $N_a$ of negligible resistance forming the fourth leg. No difference in potential normally exists between terminals 6 and 7 and the windings $N_a$ and $N_b$ are so proportioned that the resultant induced electromotive force is zero, so that the equality of potential between 6 and 7 is not disturbed. Hence no energy is lost in the winding X, the only loss being that due to current flowing in the transmitter T, which is commensurate with the transmitter loss in the standard substation.

The only difference between Figs. 1 and 4 resides in the changed connections of the transformer windings. As the first three equations of design formulæ A, give the several resistances $R_1$, $R_2$ and $R_3$ in terms of the known line resistance $R_4$ and the energy division factor $y$, the transformer constants being in no way involved, it is evident that these equations apply equally well to Fig. 4.

The formula for the ratio of the number of turns on the two transformer windings of Fig. 4 may be derived from the fourth equation of design formulæ (A) as follows:—

The number of turns $n_{42}$ connecting the line and receiver may be expressed $$n_{42} = n_a - n_b$$

when $n_a$ and $n_b$ represent the number of turns on coils $N_a$ and $N_b$ respectively. So also the number of turns $n_{14}$ connecting the line and transmitter is $$n_{14} = n_b$$

Substituting these values in the last equation of formulæ (A) we have $$\frac{n_{42}}{n_{14}} = \frac{n_a}{n_b} - 1 = y$$

Let $r$ be the ratio of the number of turns on winding $N_a$ to the number on $N_b$. Then $$r = y + 1 \quad (13)$$

The connections of the induction coil windings may be still further varied as shown in Fig. 7. In this case the transmitter, receiver, auxiliary resistance and line connections remain as before, but the terminals 6 and 7 are interconnected by a winding $N_a$ while terminals 7 and 8 are interconnected by winding $N_b$ both coils being wound in the same direction.

The operation during transmission is indicated in Fig. 8. Upon the application of a variable electromotive force to the transmitter, terminals 6, 7 and 8 would be raised to the same potential, as windings $N_a$ and $N_b$ are of negligible resistance. Resistance X would then be shortcircuited and the current would divide between the line and receiver. Owing to the inductance of the coils, however, a counter-electromotive force is induced in coil $N_a$ tending to oppose the flow of current in winding $N_a$ due to the transmitter potential, and an electromotive force is induced in winding $N_b$ tending to cause a current flow from terminal 7 to terminal 8. The effect of these induced forces is to reduce terminal 7 to the same potential as terminal 5 so that no current flows through the receiver, while the current $I_1$ flowing to terminal 6 divides and current $I_3$ flows through resistance X, the remainder passing through winding $N_a$, so that a current $I_4$ equal to transmitter current $I_1$ flows through coil $N_b$ and over the line.

During reception, as is indicated in Fig. 9, a potential applied to the line terminals causes a current $I_4$ to flow through coil $N_b$ to terminal 7' where it divides so that a current $I_1$ flows through the transmitter and a current $I_2$ flows through the receiver to common terminal 5, and from this point a current $I_4$ flows back over the line. No current flows through resistance X which is connected across neutral points 6 and 7 of a Wheatstone bridge similar to that described in connection with Fig. 6. No difference in potential would normally exist between points 6 and 7 and coils $N_a$ and $N_b$ are so proportioned that the induced electromotive force in each shall be zero so that this condition shall not be disturbed. No energy is therefore lost in the auxiliary resistance.

As in the modification of Fig. 4, the first three equations of design formulæ (A) apply equally well to the modification of Fig. 7 and from these three equations the resistance of the transmitter, receiver and auxiliary resistance may be determined in terms of the known line resistance and the energy division factor $y$. The design formula for the transformer may be derived from the fourth equation of design formulæ (A) thus:

$$n_{42} = n_b$$

$$n_{14} = n_a - n_b$$

$$\frac{n_{42}}{n_{14}} = \frac{n_b}{n_a - n_b} = y$$

Letting $\frac{n_a}{n_b} = r$ we have $$r = \frac{y+1}{y} \quad (14)$$

Figure 10:
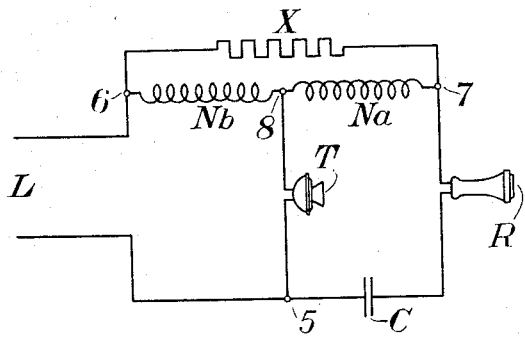
Figure 10A:
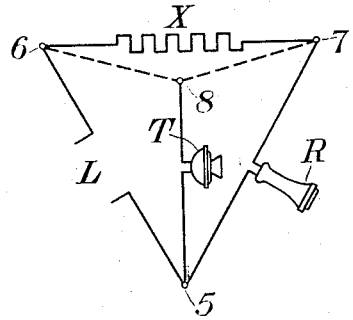

A slightly different type of circuit is illustrated in Fig. 10. This circuit differs from that of Fig. 1 in that the transmitter and line are interchanged, as will be readily apparent from a comparison of Figs. 1(a) and 10(a). The coils $N_a$ and $N_b$ of the transformer are oppositely wound, and if desired a condenser C may be provided in the receiver circuit to prevent the flow of direct current.

Figure 11:
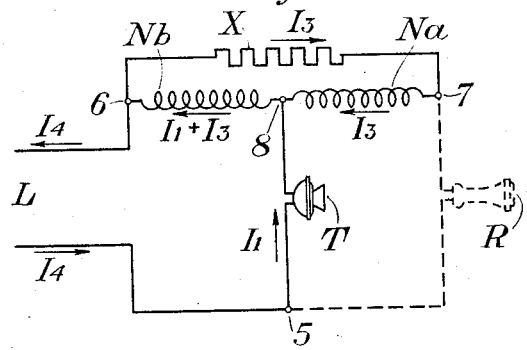

The operation during transmission will be clear from Fig. 11. A variable electromotive force at the transmitter tends to raise points 6 and 7 to the same potential, as the windings $N_a$ and $N_b$ are of negligible resistance. Due to the induction of the coils, however, a counter-electromotive force is induced in winding $N_a$ so that terminal 7 is reduced to the same potential as terminal 5, and no current flows through the receiver, while the induced electromotive forces cause a current $I_3$ to flow through the resistance X from terminals 6 to 7 and then through winding $N_a$. Transmitter current $I_1$ joins this current at 8 so that a current $I_1 + I_3$ flows through coil $N_b$ and a current $I_4$ equal to the transmitter current flows over the line and back to the transmitter.

Figure 12:
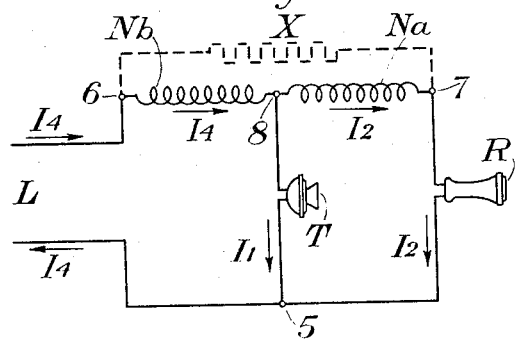

The action during the reception of signals is indicated in Fig. 12. A potential applied to the line terminals causes a line current to flow through winding $N_b$ to terminal 8 where it tends to divide, a current $I_1$ flowing through the transmitter and a current $I_2$ flowing through the winding $N_a$ and the receiver. As windings $N_a$ and $N_b$ are of negligible resistance, terminals 6, 8 and 7 would be at the same potential and no current would flow through the auxiliary resistance. The windings are so proportioned that no induced electromotive force results from the flow of current through the windings and the points 6 and 7 remain at the same potential notwithstanding the inductive relation of the coils.

The design formulæ may be obtained in a manner analogous to that described in connection with Fig. 1. The first requirement is that of conjugacy of transmitter and receiver during transmission. From Fig. 11 it is clear that since terminals 5 and 7 are at the same potential with respect to terminal 6, the drop through the line is equal to the drop through the auxiliary resistance X. Hence $$R_3 I_3 = R_4 I_4$$

Since the total magnetizing current in windings $N_a$ and $N_b$ is zero, and the current flowing through winding $N_b$ is $I_4 + I_3$, we have $$n_{14}(I_4 + I_3) = n_{12} I_3$$

or $$n_{14} I_4 = (n_{12} - n_{14}) I_3$$

From the above equations we get as the expressions satisfying the requirement of conjugacy of transmitter and receiver, $$\frac{R_3}{R_4} = \frac{n_{12} - n_{14}}{n_{14}} \quad (15)$$

The equations from which the expression for conjugacy of line and auxiliary resistance during reception is obtained, may be determined in a similar manner from Fig. 12. Thus, since 6 and 7 are at the same potential the total drop through windings $N_a$ and $N_b$ is zero. Hence $$K n_{12} - K n_{14} = 0.$$

From this it follows that K, the drop per turn is zero. If then a potential V be applied to the line terminals the drop through the transformer windings may be disregarded and we have $$V = R_1 I_1 = R_2 I_2$$

As the total magnetizing current in the transformer is zero $$n_{14} I_4 = I_2 n_{12}.$$

As $I_4 = I_1 + I_2$ this expression may be written $$I_1 n_{14} = I_2 (n_{12} - n_{14}).$$

From these several equations we get, as the expression for conjugacy of line and auxiliary resistance $$\frac{R_1}{R_2} = \frac{n_{14}}{n_{12} - n_{14}} \quad (16)$$

It has just been shown that $$I_4 = I_1 + I_2$$

and $$I_1 n_{14} = I_2 (n_{12} - n_{14}).$$

From these expressions it is obvious that during reception $I_1$, $I_2$ and $I_4$ are proportional to $n_{12} - n_{14}$, $n_{14}$ and $n_{12}$ respectively. Substituting these values in equation (1) we have as the expression for maximum absorption of energy by the receiver, $$R_4(n_{12})^2 = R_2(n_{14})^2 + R_1(n_{12} - n_{14})^2 \quad (17)$$

Substituting the same values in equation (6) the expression for over-all efficiency and discrimination against line noise becomes $$R_1(n_{12} - n_{14})^2 = y R_2(n_{14})^2 \quad (18)$$

During transmission it has just been shown that the following expressions may be obtained from Fig. 11:

$$I_4 = I_1$$
$$n_{14} I_4 = I_3 (n_{12} - n_{14})$$

From these equations it is clear that during transmission currents $I_4$, $I_3$ and $I_1$, are proportional to $n_{12} - n_{14}$, $n_{14}$ and $n_{12} - n_{14}$ respectively. Substituting in equation (2) the expression for maximum output of the transmitter becomes $$R_1(n_{12} - n_{14})^2 = R_4(n_{12} - n_{14})^2 + R_3(n_{14})^2 \quad (19)$$

From equations (15) to (19) inclusive, the following design formulæ may be obtained:

$$\left.\begin{array}{l} R_1 = \dfrac{y+1}{y} R_4 \\ R_2 = (y+1) R_4 \\ R_3 = y R_4 \\ \dfrac{n_{12}}{n_{14}} = y+1 \end{array}\right\} (B)$$

Letting the ratio of the number of turns on coil $N_a$ to the number on coil $N_b$ be designated as $r$, the last equation may be written $$r = y + 1 \quad (20).$$

In Fig. 13 is illustrated a variation of the modification of Fig. 10, in which the connections of the induction coil windings are varied in a manner analogous to that shown in Fig. 4, as will be clear from a comparison of Figs. 1(a), 4(a), 10(a) and 13(a). The coils $N_a$ and $N_b$ are oppositely wound.

The operation during transmission is illustrated in Fig. 14. Variations of potential at the transmitter tend to raise terminals 8, 6 and 7 to the same potential so that the current tends to divide between the line and the receiver, the auxiliary resistance being in effect shortcircuited. Due to the inductive relation of windings $N_a$ and $N_b$, however, an electromotive force is induced in winding $N_a$ of such direction and value as to reduce the potential of terminal 7 to that of terminal 5, at the same time balancing the electromotive force at terminal 6 tending to shunt part of the current away from the line and through winding $N_a$ to the receiver. As a result a current $I_4$ equal to current $I_1$ flows to the line, while the induced electromotive force in the winding $N_a$ causes a current $I_3$ to flow from terminal 6 to 7 through the auxiliary resistance X. As terminals 5 and 7 are at the same potential no current flows through the receiver.

During reception, as indicated in Fig. 15, a potential applied to the line terminals causes a current $I_4$ to flow to terminal 6 where it divides, part of the current flowing through winding $N_b$ and the transmitter, and part flowing through winding $N_a$ and the receiver. As coil $N_a$ is of negligible resistance points 6 and 7 are at the same potential. The coils are so proportioned that no induced electromotive force results, and terminals 6 and 7 remain at the same potential with the result that no current flows through the auxiliary resistance while currents $I_1$ and $I_2$ traverse the transmitter and receiver respectively.

As the various elements in this modification are connected in the same manner as in Fig. 10, with the exception of the windings of the transformer, it is obvious that the first three equations of formulæ (B) apply also to this modification. The formula for the design of the transformer may be derived from the fourth equation of formulæ (B) as follows:

Let $n_a$ and $n_b$ represent the number of turns on windings $N_a$ and $N_b$. Then $$\frac{n_{12}}{n_{14}} = \frac{n_a + n_b}{n_b}$$

Letting the ratio of the number of turns on winding $N_a$ to that on $N_b$ equal $r$ we have from the fourth equation of formulæ (B), $$1 + r = y + 1$$

whence $$r = y \quad (21)$$

Figure 16:
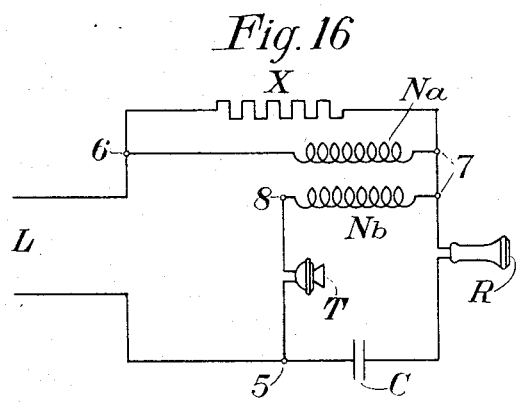
Figure 16A:
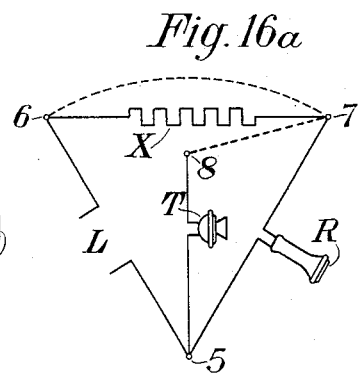

A still further modification of the type of substation illustrated in Fig. 10 may be produced by changing the connections of the transformer windings so that the common terminal thereof shall be connected to the receiver at 7 instead of to the transmitter at 8, this modification being illustrated in Fig. 16. Both coils $N_a$ and $N_b$ are in this case wound in the same direction.

Figure 17:
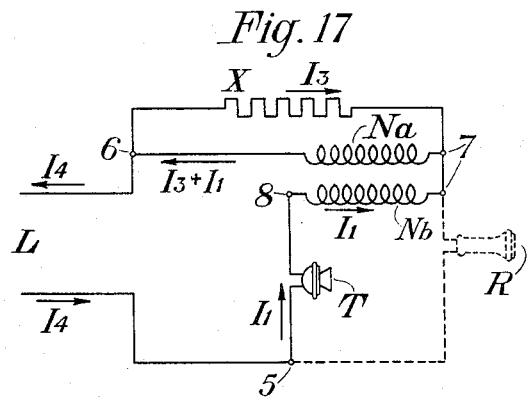

The operation during transmission will be clear from Fig. 17. A potential variation at the transmitter tends to raise terminals 8, 7 and 6 to the same potential, so that resistance X would be in effect shunted and the current flow would tend to divide between the receiver and the line. Due to the high self impedance of winding $N_b$ a counter-electromotive force is induced which reduces the potential of terminal 7 to the same potential as terminal 5 so that no current flows through the receiver, while an electromotive force is induced in coil $N_a$ in a direction tending to cause a flow of current through the coil from 7 to 6, so that a current $I_3$ flows through the resistance X, and a current $I_4$ flows over the line and back to the transmitter.

Figure 18:
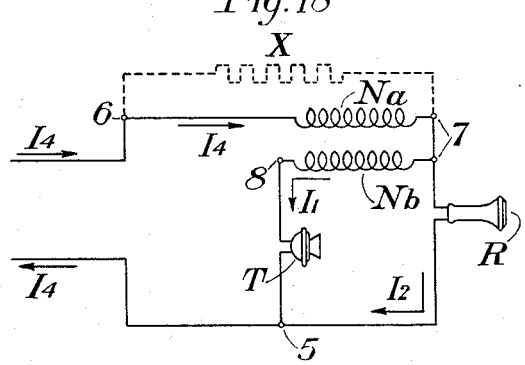

The operation during reception is indicated in Fig. 18. A potential applied to the line terminals causes a current $I_4$ to flow to terminal 6 and through winding $N_a$ of negligible resistance to terminal 7 which would be at substantially the same potential as terminal 6, the resistance X being in effect shortcircuited. At terminal 7 the current divides, and a current $I_1$ flows through the winding $N_b$ and the transmitter, while a current $I_2$ flows through the receiver R. The coils are so proportioned that there is no induced electromotive force and consequently terminals 6 and 7 remain at the same potential so that no current is wasted through the auxiliary resistance.

Design formulæ (B) also apply to this modification. The fourth equation of design formulæ (B) may be expressed in terms of the ratio of the number of turns on winding $N_a$ to the number on winding $N_b$ as follows:

$$\frac{n_{12}}{n_{14}} = \frac{n_b}{n_b - n_a} = y + 1$$

Let $$\frac{n_a}{n_b} = r$$

Then the above expression becomes $$\frac{1}{1-r} = y + 1$$

or $$r = \frac{y}{y+1} \quad (22)$$

A third general type which differs from the general type illustrated in Fig. 10, in that the transmitter and receiver are interchanged, is illustrated in Fig. 19. The difference between the modifications of Figs. 1, 10 and 19 will be readily apparent from a comparison of the simplified diagrams of Figs. 1(a), 10(a) and 19(a). The coils of the transformer are wound in opposite directions.

The operation during transmission is indicated in Fig. 20. Assuming a variable electromotive force applied at the transmitter, since the resistance of windings $N_a$ and $N_b$ is negligible, terminals 6 and 8 would be at the same potential as terminal 7 thus causing current flow through the line and receiver in parallel, were it not for the fact that windings $N_a$ and $N_b$ have high inductance. Owing to the inductance of the windings, however, a counter-electromotive force is set up in winding $N_a$, and an electromotive force tending to cause current flow from 8 to 6 is set up in winding $N_b$. These forces coact to reduce terminal 8 to the same potential as terminal 5 so that no current flows through the receiver, and at the same time the potential of terminal 6 is lowered below that of terminal 7 so that a current $I_3$ flows through the resistance X from 7 to 6. Due to the difference in potential between points 6 and 5 a current $I_4$ flows over the line. No current flows through the windings $N_a$ and $N_b$ and the three currents $I_1$, $I_3$ and $I_4$ are equal, so that a current flows serially through the transmitter, auxiliary resistance and the line.

During reception the operation as indicated in Fig. 21 is as follows:—A potential applied to the line causes a current $I_4$ to flow to terminal 6, and through winding $N_b$ to terminal 8. As the windings $N_a$ and $N_b$ are of negligible resistance points 8 and 7 have the same potential as terminal 6, so that no current flows through the auxiliary resistance X, while a current $I_2$ flows through the receiver, and current $I_1$ flows through winding $N_a$ and the transmitter. The coils are so proportioned that no resultant electromotive force is induced in the windings and consequently terminals 6 and 7 remain at the same potential and no energy is wasted in the auxiliary resistance.

The design formulæ for the modification of Fig. 19 may be derived in a manner similar to that discussed in connection with Fig. 1. Thus from Fig. 20 it is apparent that $$I_1 = I_3 = I_4$$
$$V = K n_{12}$$
$$V = R_3 I_3 + R_4 I_4 = (R_3 + R_4) I_1$$

and $$K n_{12} - K n_{42} = R_3 I_3 = R_3 I_1$$

From the above the following expression satisfying the requirement of conjugacy of transmitter and receiver may be obtained:

$$\frac{R_3}{R_4} = \frac{n_{12} - n_{42}}{n_{42}} \quad (23)$$

Similarly from Fig. 21 it is clear that $$I_4 = I_2 + I_1$$

and $$K n_{42} + K n_{12} = 0$$

whence $$K = 0$$

Also it is clear from Fig. 21 that $$V = K n_{42} + R_2 I_2$$

and $$V = K n_{42} + K n_{12} + R_1 I_1$$

As K equals zero it is apparent that (a) $\quad R_1 I_1 = R_2 I_2$

From the theory of transformer action, it is clear from Fig. 21 that $$I_4 n_{42} = I_1 n_{12}$$

which may be expressed $$(I_2 + I_1) n_{42} = I_1 n_{12}$$

or (b) $\quad I_2 n_{42} = I_1 (n_{12} - n_{42})$

Solving this equation and equation (a) above we obtain as the equation satisfying conjugacy of line and auxiliary resistance the following:

$$\frac{R_1}{R_2} = \frac{n_{12} - n_{42}}{n_{42}} \quad (24)$$

From equation (b) it is apparent that during reception $I_2$ is proportional to $n_{12} - n_{42}$ and $I_1$ is proportional to $n_{42}$. Since $$I_4 = I_2 + I_1$$

it follows that $I_4$ is proportional to $n_{12}$. Substituting these values in equation (1) we get as the expression for maximum absorption by the receiver $$R_4 (n_{12})^2 = R_2 (n_{12} - n_{42})^2 + R_1 (n_{42})^2 \quad (25)$$

Substituting the same values in equation (6) we have as the expression for energy division and over-all efficiency $$R_1 = y R_2 \left( \frac{n_{12} - n_{42}}{n_{42}} \right)^2 \quad (26)$$

It has been shown that during transmission $I_1 = I_3 = I_4$. Hence in equation (2) these symbols may be canceled and equation (2) reduces to $$R_1 = R_3 + R_4 \quad (27)$$

as the expression for maximum output of the transmitter.

Simplifying and collecting equations (23) to (27) inclusive, the following design formulæ are obtained:

$$\left. \begin{array}{l} R_1 = \dfrac{y+1}{y} R_4 \\[4pt] R_2 = (y+1) R_4 \\[4pt] R_3 = \dfrac{R_4}{y} \\[4pt] \dfrac{n_{12}}{n_{42}} = \dfrac{y+1}{y} \end{array} \right\} (C)$$

Denoting the ratio of the number of turns on winding $N_a$ to the number on $N_b$ as $r$ we have $$\frac{n_{12}}{n_{42}} = \frac{n_a}{n_b} = r$$

Therefore the fourth equation may be expressed $$r = \frac{y+1}{y} \quad (28)$$

Fig. 22 illustrates a modification of the general type of substation illustrated in Fig. 19, in which the transformer connections are interchanged in a manner analogous to that of Figs. 4 and 13, as will be clear from a comparison of the corresponding schematic diagrams. The common terminal of the two coils is connected to terminal 6 and their other terminals are connected to terminals 7 and 8, the coils being oppositely wound.

The operation during transmission is indicated in Fig. 23. A variable electromotive force applied to the transmitter tends to raise points 7, 6 and 8 to the same potential so that current tends to flow through winding $N_a$ to terminal 6 and divide between the line and the transmitter. Owing to the high self inductance of coil $N_a$, a counter-electromotive force is induced in said winding which prevents any flow of current from 7 to 6, through said winding, and reduces the potential of terminal 6 below that of terminal 7, while an electromotive force is induced in winding $N_b$ which reduces terminal 8 to the same potential as terminal 5. As a result no current flows through the coil $N_b$ and the receiver or through the coil $N_a$, while a current $I_3$ flows through the resistance X between terminals 7 and 6, and a current $I_4$ flows over the line. Currents $I_1$, $I_3$ and $I_4$ are equal and hence a current flows serially through the transmitter, auxiliary resistance and line.

During reception, as shown in Fig. 24, a potential applied to the line terminals causes a current $I_4$ to flow to terminal 6, where it divides and a current $I_1$ flows through the winding $N_a$ and the transmitter, while a current $I_2$ flows through the winding $N_b$ and the receiver. As the windings $N_a$ and $N_b$ are of negligible resistance terminals 6, 7 and 8 are at substantially the same potential. The coils are so proportioned that no resultant electromotive forces are induced therein and the points 6 and 7 therefore remain at the same potential, so that no current flows through the auxiliary resistance.

As the elements in this modification, aside from the transformer connections, are arranged the same as in Fig. 19 it is evident that the first three equations of design formulæ (C) apply equally well to Fig. 22. The fourth equation for Fig. 22 may be derived from the fourth equation of design formulæ (C) as follows:—

Letting the ratio of the number of turns on winding $N_a$ to the number on $N_b$ be designated as $r$ we have $$\frac{n_{12}}{n_{42}} = \frac{n_a + n_b}{n} = r + 1 = \frac{y+1}{y}$$

Hence $$r = \frac{1}{y} \quad (29)$$

Figure 25:
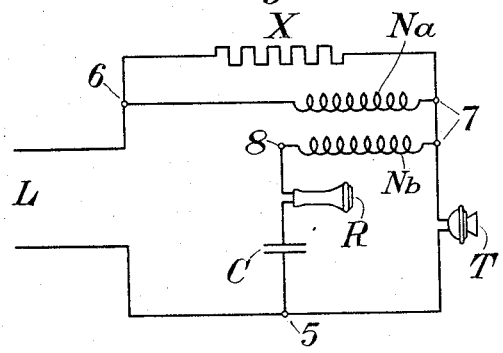
Figure 25A:
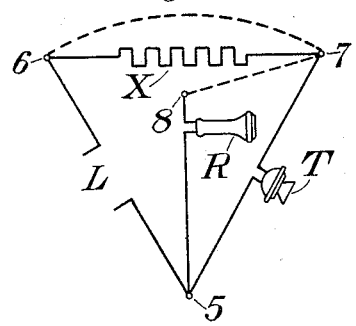

A third modification of the general form illustrated in Fig. 19 is shown in Fig. 25. In this case the connections of the induction coil are interchanged in a manner analogous to that shown in Figs. 7 and 16, the common terminal being connected to 7 and the other terminals to 6 and 8. The coils in this case are wound in the same direction, the other elements remaining as before.

Figure 26:
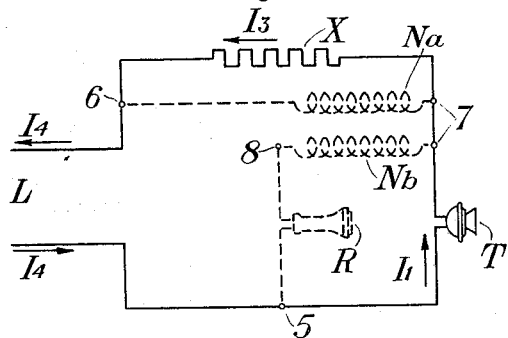

The operation during transmission as shown in Fig. 26, is as follows:—

A variable potential applied to the transmitter tends to bring terminals 7, 6 and 8 to the same potential, thereby shunting resistance X and tending to cause the current flow to divide between the line and the receiver. Owing to the high inductance of windings $N_a$ and $N_b$ however, a counter-electromotive force is induced in winding $N_b$ and lowers terminal 8 to the same potential as 5 so that no current flows through the receiver. Likewise a counter-electromotive force is induced in winding $N_a$ which prevents the flow of current therethrough and lowers the potential of terminal 6 so that a current $I_3$ flows through the auxiliary resistance, and a current $I_4$ over the line. As $I_1$, $I_2$ and $I_4$ are equal a current flows serially through the transmitter, auxiliary resistance and line and no current traverses the receiver or the induction coil windings.

Figure 27:
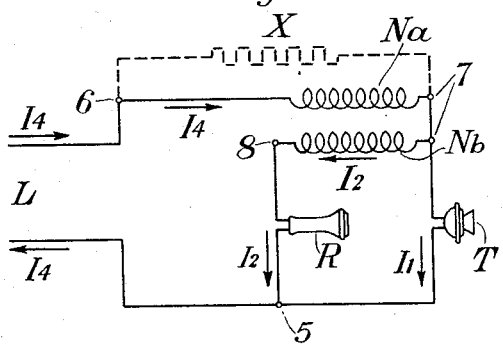

During reception, as indicated in Fig. 27, a potential applied to the line terminals causes a current $I_4$ to flow through winding $N_a$ to the terminal 7 where it divides and current $I_1$ flows through the transmitter, and current $I_2$ flows through the winding $N_b$ and the receiver. As the windings are of negligible resistance, points 6, 7 and 8 are at the same potential. The coils are so proportioned that no resultant electromotive forces are induced therein, and the uniform potential of terminals 6 and 7 is not disturbed, so that no current flows through the auxiliary resistance.

Here again the design formulæ (C) apply, the last equation being expressed in terms of $r$, the ratio of the number of turns on $N_a$ to the number on $N_b$ as follows:—

$$\frac{n_{12}}{n_{42}} = \frac{n_b}{n_b - n_a} = \frac{1}{1-r} = \frac{y+1}{y}$$

$$1 - r = \frac{y}{y+1}$$

whence $$r = \frac{1}{y+1} \quad (30)$$

The type of substation disclosed above and illustrated in the accompanying drawing is but one of a large number employing only one transformer and one auxiliary resistance and all of these are ideal in the sense that they satisfy the fundamental requirements for an ideal substation, as stated heretofore in this specification. It will be understood therefore, that my invention is not limited to the specific embodiments herein illustrated, but is broadly directed to providing a substation comprising a single transformer and only one auxiliary element, which is so proportioned with reference to the line with which it is to be coöperatively combined, that it is ideally efficient and substantially without side tone. Furthermore, I do not desire to limit the design of the substations herein disclosed and illustrated to the accompanying design formulæ. These formulæ are derived on the assumption that ideal transformers are employed and that the component elements have no reactance, assumptions which are only approximately justified in practice. When particularly high precision is desired I may, therefore, proportion the substation more precisely by taking into account the fact that the transformer impedances are finite, and that the line and the various substation elements may have in general some reactance. The accompanying formulæ, however, give quite satisfactory results, and the methods by which they are derived will enable one skilled in the art, to compute more precisely the substation constants when desired.

It will be understood that in the appended claims, where certain elements are said to be conjugate, or certain impedance relations are said to exist, since in practice these conditions can, in general, only be approximated, these expressions will be satisfied by structures substantially conforming thereto, especially where some compromise with regard to the rigid requirements is necessary in order to discriminate against line noise. It will be further understood that while I have specifically illustrated and described my invention as embodied in a telephone substation it is capable of many and varied embodiments which render it applicable in other kinds of signaling systems and consequently my invention is not to be limited to the particular form and use herein disclosed.

What is claimed is:

1. The combination of a substation and a telephone line, said substation comprising a transmitter, a receiver, an auxiliary resistance, and a transformer having two windings, three of the four component elements consisting of line, transmitter, receiver and auxiliary resistance having one terminal in common, and having their other terminals connected by the windings of said transformer, and the fourth component element being also connected to two of said other terminals, the transformer ratios and the impedances of two of said component elements being so proportioned with reference to the impedance of the other two of said component elements that said receiver and transmitter are conjugate.

2. The combination of a substation and a telephone line, said substation comprising a transmitter, a receiver, an auxiliary resistance, and a transformer having two windings, three of the four component elements consisting of line, transmitter, receiver and auxiliary resistance having one terminal in common, and having their other terminals connected by the windings of said transformer, and the fourth component element being also connected to two of said other terminals, the transformer ratios and the impedances of two of said component elements being so proportioned with reference to the impedance of the other two of said component elements that said auxiliary resistance and said line are conjugate.

3. The combination of a substation and a telephone line, said substation comprising a transmitter, a receiver, an auxiliary resistance, and a transformer having two windings, three of the four component elements consisting of line, transmitter, receiver and auxiliary resistance having one terminal in common, and having their other terminals connected by the windings of said transformer, and the fourth component element being also connected to two of said other terminals, the transformer ratios and the impedances of two of said component elements being so proportioned with reference to the impedance of the other two of said component elements that the impedance of the substation as seen from the line is equal to the impedance of the line.

4. The combination of a substation and a telephone line, said substation comprising a transmitter, a receiver, an auxiliary resistance, and a transformer having two windings, three of the four component elements consisting of line, transmitter, receiver and auxiliary resistance having one terminal in common, and having their other terminals connected by the windings of said transformer, and the fourth component element being also connected to two of said other terminals, the transformer ratios and the impedances of two of said component elements being so proportioned with reference to the impedance of the other two of said component elements that the impedance of the combination consisting of the line, receiver and auxiliary resistance as seen from the transmitter is equal to the impedance of the transmitter.

5. The combination of a substation and a telephone line, said substation comprising a transmitter, a receiver, an auxiliary resistance, and a transformer having two windings, three of the four component elements consisting of line, transmitter, receiver and auxiliary resistance having one terminal in common, and having their other terminals connected by the windings of said transformer, and the fourth component element being also connected to two of said other terminals, the transformer ratios and the impedances of two of said component elements being so proportioned with reference to the impedance of the other two of said component elements that said receiver and transmitter are conjugate, that said auxiliary resistance and said line are conjugate, that the impedance of the substation as seen from the line is equal to the impedance of the line and that the impedance of the combination consisting of the line, receiver and auxiliary resistance as seen from the transmitter is equal to the impedance of the transmitter.

6. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals.

7. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned, and the connections such, that the transmitter supplies maximum energy without absorption of energy by the receiver.

8. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned, and the connections such, that substantially none of the energy supplied by the transmitter shall be absorbed by the receiver.

9. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned and the connections such that the transmitter supplies maximum effective energy.

10. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned, and the connection such, that maximum energy is absorbed by the receiver from the line when receiving.

11. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned and the connections such, that maximum energy is absorbed by the receiver from the line without absorption of energy by said resistance.

12. A telephone apparatus, comprising a line, a transmitter, a receiver and an auxiliary resistance, three of said elements having a common terminal, an induction coil comprising two windings, said windings interconnecting the remaining terminals of the three elements, the fourth element being also connected to two of said other terminals, the parts being so proportioned, and the connections such, that the transmitter supplies maximum energy to the line without absorption of energy by the receiver when the apparatus is transmitting, and maximum energy is absorbed by the receiver from the line when the apparatus is receiving, without absorption of energy by said resistance.

13. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals.

14. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned, and the connections such, that the transmitter supplies maximum energy without absorption of energy by the receiver.

15. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned, and the connections such, that substantially none of the energy supplied by the transmitter shall be absorbed by the receiver.

16. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned and the connections such that the transmitter supplies maximum effective energy.

17. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned, and the connections such, that maximum energy is absorbed by the receiver from the line when receiving.

18. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned and the connections such, that maximum energy is absorbed by the receiver from the line without absorption of energy by said resistance.

19. A telephone apparatus comprising a line, a transmitter, a receiver and an auxiliary resistance, and an induction coil having a plurality of windings, said line, transmitter and receiver having a common terminal, the other terminals being connected through the windings of the transformer, said auxiliary resistance also being connected to two of said other terminals, the parts being so proportioned, and the connections such, that the transmitter supplies maximum energy to the line without absorption of energy by the receiver when the apparatus is transmitting, and maximum energy is absorbed by the receiver from the line when the apparatus is receiving, without absorption of energy by said resistance.

20. A telephone apparatus comprising a line, transmitter, receiver and auxiliary resistance, and a two winding induction coil, said line, transmitter and receiver having a common terminal, the other terminals being interconnected through the windings of the induction coil, two of said other terminals being also interconnected through said auxiliary resistance, said elements being proportioned in accordance with the following design formulæ:

$$R_1 = \frac{y+1}{y} R_4$$

$$R_2 = (y+1) R_4$$

$$R_3 = fy R_4$$

$$r = f'y$$

where $R_1$, $R_2$, $R_3$ and $R_4$ represent the characteristic resistance of the transmitter, receiver, auxiliary resistance and line respectively, $r$ is the ratio between the number of turns on the two transformer windings, $y$ is the ratio of the energy absorbed by the transmitter to that absorbed by the receiver during reception, and $f\,y$ and $f'\,y$ are functions of the constant $y$.

21. In a two-way signaling system, the combination of a transformer having a plurality of windings, and four component elements consisting, respectively, of a circuit for the transmission and reception of signals, a transmitting circuit proper, a receiving circuit proper and a balancing circuit, three of said component elements being connected in a closed circuit, a series circuit including the fourth component element and one winding of said transformer connected to two of the junction points of the three component elements of said closed circuit, and another of the transformer windings connecting the third junction point with said series circuit, said elements being so proportioned and related that the impedance of the combination comprising said first named circuit, said receiving circuit proper, said balancing circuit and said transformer, as seen from said transmitting circuit proper, is equal to the impedance of said transmitting circuit proper.

22. In a two-way signaling system, the combination of a transformer having a plurality of windings, and four component elements consisting, respectively, of a circuit for the transmission and reception of signals, a transmitting circuit proper, a receiving circuit proper and a balancing circuit, three of said component elements being connected in a closed circuit, a series circuit including the fourth component element and one winding of said transformer connected to two of the junction points of the three component elements of said closed circuit, and another of the transformer windings connecting the third junction point with said series circuit, said elements being so proportioned and related that said receiving circuit and said transmitting circuit proper are conjugate.

23. In a two-way signaling system, the combination of a transformer having a plurality of windings, and four component elements consisting, respectively, of a circuit for the transmission and reception of signals, a transmitting circuit proper, a receiving circuit proper and a balancing circuit, three of said component elements being connected in a closed circuit, a series circuit including the fourth component element and one winding of said transformer connected to two of the junction points of the three component elements of said closed circuit, and another of the transformer windings connecting the third junction point with said series circuit, said elements being so proportioned and related that said balancing circuit and said first named circuit are conjugate.

24. In a two-way signaling system, the combination of a transformer having a plurality of windings, and four component elements consisting, respectively, of a circuit for the transmission and reception of signals, a transmitting circuit proper, a receiving circuit proper and a balancing circuit, three of said component elements being connected in a closed circuit, a series circuit including the fourth component element and one winding of said transformer connected to two of the junction points of the three component elements of said closed circuit, and another of the transformer windings connecting the third junction point with said series circuit, said elements being so proportioned and related that the impedance of the combination, comprising said transmitting circuit proper, said receiving circuit proper, said balancing circuit and said transformer, as seen from said first named circuit, is equal to the impedance of said first named circuit.

25. In a two-way signaling system, the combination of a transformer having a plurality of windings, and four component elements consisting, respectively, of a circuit for the transmission and reception of signals, a transmitting circuit proper, a receiving circuit proper and a balancing circuit, three of said component elements being connected in a closed circuit, a series circuit including the fourth component element and one winding of said transformer connected to two of the junction points of the three component elements of said closed circuit, and another of the transformer windings connecting the third junction point with said series circuit, said elements being so proportioned and related that said transmitting circuit and said receiving circuit are conjugate; said first named circuit and said balancing circuit are conjugate; the impedance of the combination, comprising said first named circuit, said receiving circuit proper, said balancing circuit and said transformer, as seen from said transmitting circuit, is equal to the impedance of said transmitting circuit; and the impedance of the combination, comprising said transmitting circuit proper, said receiving circuit proper, said balancing circuit and said transformer, as seen from said first named circuit, is equal to the impedance of said first named circuit.

In testimony whereof, I have signed my name to this specification in the presence of two subscribing witnesses, this first day of September, 1916.

GEORGE A. CAMPBELL.

Witnesses:
C. C. ROSE,
JOHN R. CARSON.